(12) United States Patent
Mencos

(10) Patent No.: US 10,563,806 B2
(45) Date of Patent: Feb. 18, 2020

(54) ELECTROFUSION PIPE FITTINGS, METHODS, AND SYSTEMS

(71) Applicant: Ruben Adolfo Mencos, Reykjavik (IS)

(72) Inventor: Ruben Adolfo Mencos, Reykjavik (IS)

( * ) Notice: Subject to any disclaimer, the term of this patent is extended or adjusted under 35 U.S.C. 154(b) by 22 days.

(21) Appl. No.: 15/548,943

(22) PCT Filed: Feb. 5, 2016

(86) PCT No.: PCT/US2016/016851
§ 371 (c)(1),
(2) Date: Aug. 4, 2017

(87) PCT Pub. No.: WO2016/127103
PCT Pub. Date: Aug. 11, 2016

(65) Prior Publication Data
US 2018/0009174 A1    Jan. 11, 2018

(30) Foreign Application Priority Data

Feb. 6, 2015  (IS) .......................................... 50100

(51) Int. Cl.
*F16L 47/03* (2006.01)
*B29C 65/34* (2006.01)
*B29C 65/00* (2006.01)
*B29C 65/82* (2006.01)

(52) U.S. Cl.
CPC .......... *F16L 47/03* (2013.01); *B29C 65/3432* (2013.01); *B29C 65/8246* (2013.01); *B29C 66/1122* (2013.01); *B29C 66/1142* (2013.01); *B29C 66/52296* (2013.01); *F16L 2201/30* (2013.01)

(58) Field of Classification Search
CPC ....... F16L 47/03; F16L 2201/30; F16L 53/38; B29C 65/8246; B29C 65/3468; B29C 65/3432; G01M 3/143; B28C 66/1142; B28C 66/5521; B28C 66/1122; B28C 66/5523; B28C 66/71
USPC .......................................... 285/21.1, 21.2, 41
See application file for complete search history.

(56) References Cited

U.S. PATENT DOCUMENTS 4,226,444 A * 10/1980 Bunyan ........................ 285/21.1
4,906,313 A *  3/1990 Hill ........................ F16L 47/03
                                                    285/21.2 X
5,990,462 A * 11/1999 Scholl ..................... F16L 47/03

* cited by examiner

*Primary Examiner* — Zachary T Dragicevich
(74) *Attorney, Agent, or Firm* — Katz Law Group; Gary P. Katz

(57) ABSTRACT

Pipe fittings, systems, and methods are discussed including-pipe fittings with pairs of circumferential sealing zones and a pressure-testing chamber between the sealing zones. In addition, pipe fittings with sensors for detecting a breach in one or more sealing zones, data trackers for collecting information about the pressure-testing chamber and/or breaches in the sealing zones and a dormant power source that becomes powered upon an aqueous breach of one or more sealing zones are discussed.

26 Claims, 4 Drawing Sheets

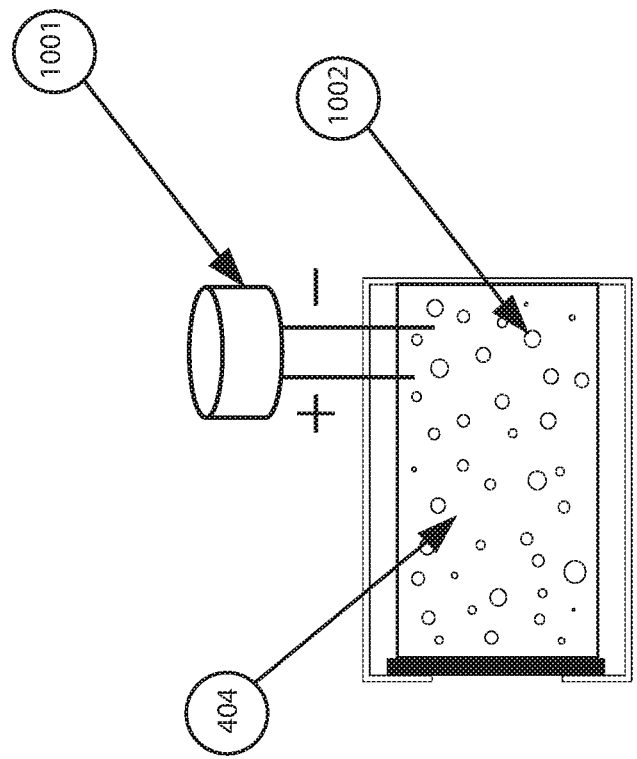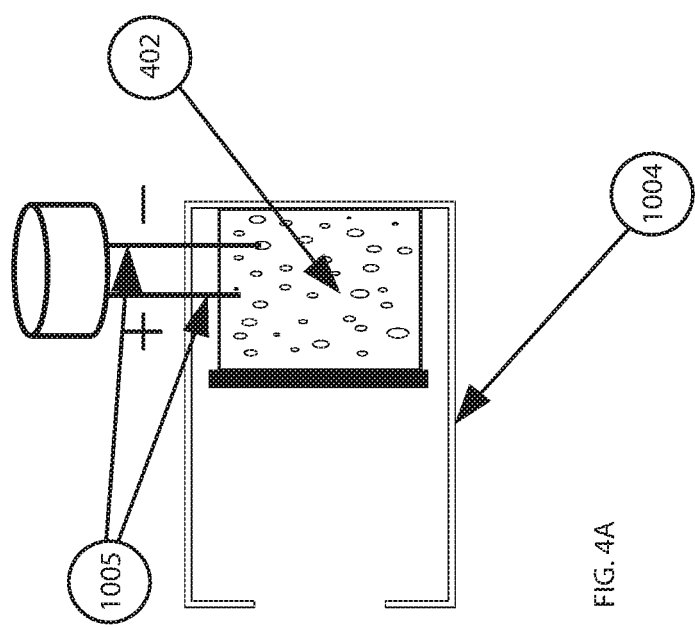

ELECTROFUSION PIPE FITTINGS, METHODS, AND SYSTEMS

PRIORITY

This application is the National Stage of International Application No. PCT/US16/16851 filed Feb. 5, 2016 which claims the benefit of Icelandic Patent application No. 50100, filed Feb. 6, 2015.

FIELD

This disclosure relates to electrofusion joint seals for polyethylene and polypropylene pipe and methods thereof. More specifically, this disclosure relates to testing and monitoring the integrity of electrofusion joint seals.

BACKGROUND

Polyethylene (PE) is commonly used in plastic pipes for gas and water supply, where high-density polyethylene (HDPE) is the most common ingredient. When laying PE pipes or fixing ruptured or broken pipes, the PE pipes are typically joined using fusion welding such as butt fusion, electrofusion, or hot iron fusion.

In general, an electrofusion joint fitting comprises tubular openings adapted to receive a pipe to be connected to the fitting. An electrofusion element is arranged in the tubular opening at the inner surface to be adjacent to the outer surface of the pipe, which is inserted into the fitting. Typically, an electrofusion element comprises an electrical heating coil of resistance wire positioned some distance into the fitting. The electrofusion element can be marked by a rib or edge. The coil is connected to contacts for supplying electric current to the electrical heating coil. When the coil is energized, it heats up and causes the plastic materials of the pipe and the fitting adjacent to the electrofusion element to melt and fuse. The thicknesses of the pipe and the fitting are such that the heat only melts the inner surface of the fitting and the outer surface of the pipe.

Joint seals are the weakest points of any piping system. Welded joints of PE pipes are not always successful (i.e., they do not always have a perfect seal) due to welding errors. Welding errors may occur due to faults in cutting the pipes, poor scraping of the pipe, particles or debris in the welding zone, positioner problems, humidity, incorrect welding parameters, etc.

Currently, in PE, HDPE, or polypropylene ("PP") piping systems, a pressure test is conducted over a number of joints in a given system. These tests are typically conducted during installation (as often required by law) or at periodic intervals after the initial installation. During the test, a section containing a number of joints is closed off for the test. Upon closing all openings and filling the system with liquid (usually water), pressure is introduced. Typically, the test pressure is increased to 1.5 times the operating pressure, where it is held until it can be read and interpreted for leak tightness. HDPE and other polymers that may comprise these systems have a tendency to stretch. This pliability gives these polymers their toughness which is an asset in these fluid supply systems. However, the downside to the pliability is that the pipe sections balloon during the hydrostatic pressure test. That means that, unlike piping systems whose main ingredient may be a metal or an alloy, an additional time component must be added to the pressure-testing of plastic piping systems to account for the period of time it takes the pipe to reach its maximum ballooned state before the system can then be monitored and assessed for leak tightness. In many cases, it takes many hours for PE piping systems to reach a maximum-ballooned state. A typical hydrostatic pressure test could take 24 hours with more complex systems taking longer. Thus, complex, time-consuming logistics for hydrostatic loading and removal of test fluids are necessary and unavoidable in current practices. A simple and less time-consuming way of testing if the joints are successfully welded is desired.

In addition to improved testing devices, systems, and methods, lack of oversight infrastructure in standard pipe joining technology has allowed leaking joints to remain a global problem in piping systems. Water that leaks from piping systems is referred to as "non-revenue water," i.e., water that leaks out of water supply pipelines before being metered for revenue (also referred to as "NRW"). Infrastructure is needed to monitor and gather data from joints to reduce NRW and create a smart water network (SWN).

SUMMARY

One aspect of this disclosure is directed to a pipe fitting comprising a hollow tubular sleeve comprising a first open end and a second open end, wherein the first open end is configured to receive a first pipe and the second open end is configured to receive a second pipe; a first pair of circumferential sealing zones proximal to the first open end of the sleeve comprising a first inner circumferential sealing zone and a first outer circumferential sealing zone, wherein the first inner circumferential sealing zone comprises a first inner coil to form a seal with an inserted pipe; a first circumferential pressure chamber arranged between the first inner circumferential sealing zone and the first outer circumferential sealing zone, wherein the first circumferential pressure chamber comprises a first inlet; and a first valve and current connector fluidically coupled to the first inlet and electronically connected to the first inner coil. In some embodiments, the first outer circumferential sealing zone comprises a first outer coil to form a seal with an inserted pipe. In further embodiments, the first valve and current connector is further electronically coupled to the first outer coil.

In some embodiments, the pipe fitting further comprises a second pair of circumferential sealing zones proximal to the second open end of the sleeve comprising a second inner circumferential sealing zone and a second outer circumferential sealing zone, wherein the second inner circumferential sealing zone comprises a second inner coil to form a seal with an inserted pipe; a second circumferential pressure chamber arranged between the second inner circumferential sealing zone and the second outer circumferential sealing zone, wherein the second circumferential pressure chamber comprises a second inlet; and a second valve and current connector fluidically coupled to the second inlet and electronically connected to the second inner coil. In some embodiments, the second outer circumferential sealing zone comprises a second outer coil to form a seal with an inserted pipe. In further embodiments, the second valve and current connector is further electronically coupled to the second outer coil.

In some embodiments, the first outer circumferential sealing zone comprises an indent sized and shaped to hold an O-ring and having a depth sufficient to enable the O-ring to make a seal with an inserted pipe. In certain embodiments, the depth of the indent narrows longitudinally away from the first circumferential pressure-testing chamber along the inner surface of the fitting. When pressure is applied to the pressure-testing chamber, the O-ring slides down the narrowing indent to create a tighter seal with an inserted pipe. In further embodiments, the indent further comprises a ridge. When pressure is applied to the pressure-testing chamber, the O-ring slides down the narrowing indent and over the ridge, the O-ring becomes locked in place. In some embodiments, the fitting further comprises an O-ring disposed in the indent.

In further embodiments, the second outer circumferential sealing zone comprises an indent sized and shaped to hold an O-ring and having a depth sufficient to enable the O-ring to make a seal with an inserted pipe. In certain embodiments, the depth of the indent narrows longitudinally away from the second circumferential pressure-testing chamber along the inner surface of the fitting. When pressure is applied to the pressure-testing chamber, the O-ring slides down the narrowing indent to create a tighter seal with an inserted pipe. In further embodiments, the indent further comprises a ridge. When pressure is applied to the pressure-testing chamber, the O-ring slides down the narrowing indent and over the ridge, the O-ring becomes locked in place. In some embodiments, the fitting further comprises an O-ring disposed in the indent.

In some embodiments, the first valve and current connector further comprises a shell.

In some embodiments, the fitting comprises polyethylene. In some embodiments, the polyethylene is HDPE.

Another aspect of this disclosure is directed to a pipe fitting comprising a hollow tubular sleeve comprising a first open end and a second open end, wherein the first open end is configured to receive a first pipe and the second open end is configured to receive a second pipe; a first pair of circumferential sealing zones proximal to the first open end of the sleeve comprising a first inner circumferential sealing zone and a first outer circumferential sealing zone, wherein the first inner circumferential sealing zone comprises a first inner coil to form a seal with an inserted pipe; a first circumferential pressure chamber arranged between the first inner circumferential sealing zone and the first outer circumferential sealing zone, wherein the first circumferential pressure chamber comprises a first inlet; and a sensor fluidically coupled to the first circumferential pressure-testing chamber. In some embodiments, the first outer circumferential sealing zone comprises a first outer coil to form a seal with an inserted pipe. In certain embodiments, the first outer circumferential sealing zone comprises an indent sized and shaped to hold an O-ring. In some embodiments, the pipe fitting further comprises a second pair of circumferential sealing zones.

In some embodiments, the sensor is configured to detect a breach of the first inner circumferential sealing zone or the first outer circumferential sealing zone or a breach of both sealing zones. In certain embodiments, the sensor is selected from the group consisting of an acoustic sensor, a vibration sensor, an air-gas ratio sensor, a mass flow sensor, an O2 sensor, a CO2 sensor, a CO sensor, an H2 sensor, a chemical transistor, a chemical resistor, an ion sensor, a galvanometer, a flow sensor, a mass flow rate sensor, a strain gauge, a piezoelectric sensor, a heat flux sensor, a thermistor, and a thermocouple. In specific embodiments, the sensor is a thermocouple.

In some embodiments, the pipe fitting further comprises a data tracker coupled to the sensor. In certain embodiments, the data tracker is an RFID chip.

In some embodiments, the pipe fitting further comprises a power source electronically coupled to the sensor. In some embodiments, the power source is a battery. In some embodiments, the battery is NiCad. In some embodiments, the battery is lithium ion.

In further embodiments, the pipe fitting further comprises a dormant battery disposed in at least a portion of the first circumferential pressure-testing chamber, the dormant batter comprising a dry electrolyte; an anode; a cathode; and circuitry electronically coupling the anode, the cathode, and the sensor. In some embodiments, the pipe fitting further comprises a data tracker electronically coupled to the sensor.

In some embodiments, the fitting comprises polyethylene. In some embodiments, the polyethylene is HDPE.

Yet another aspect of this disclosure is directed to a pipe fitting comprising a hollow tubular sleeve comprising a first open end and a second open end, wherein the first open end is configured to receive a first pipe and the second open end is configured to receive a second pipe; a first pair of circumferential sealing zones proximal to the first open end of the sleeve comprising a first inner circumferential sealing zone and a first outer circumferential sealing zone, wherein the first inner circumferential sealing zone comprises a first inner coil to form a seal with an inserted pipe; a first circumferential pressure chamber arranged between the first inner circumferential sealing zone and the first outer circumferential sealing zone, wherein the first circumferential pressure chamber comprises a first inlet; a data tracker disposed at or proximal to the exterior of the sleeve; and a dormant battery disposed in at least a portion of the first circumferential pressure chamber, the dormant batter comprising a dry electrolyte; an anode; a cathode; and circuitry electronically coupling the anode, the cathode, and the data tracker.

In some embodiments, the dormant battery further comprises a stabilizer. In particular embodiments, the stabilizer is butylated hydroxytoluene.

In some embodiments of the pipe fitting, the data tracker is an RFID chip.

In some embodiments, the dry electrolyte is silver nitrate. In some embodiments, the electrolyte is nitric acid. In certain embodiments, the electrolyte is sodium chloride. In further embodiments, the electrolyte is potassium hydroxide. In still further embodiments, the electrolyte is sodium hydroxide.

In some embodiments, the anode is iron. In certain embodiments, the anode is copper. In some embodiments, the anode is zinc. In some embodiments, the cathode is manganese (IV) oxide. In certain embodiments, the cathode is silver. In some embodiments, the cathode is nickel oxide.

In some embodiments, the pipe fitting further comprises a sensor electronically coupled to the data tracker. In certain embodiments, the sensor is a thermocouple.

In some embodiments, the fitting comprises polyethylene. In some embodiments, the polyethylene is HDPE.

BRIEF DESCRIPTION OF THE FIGURES

FIG. 4A is an illustration of a sponge comprising an electrolyte. FIG. 4B shows an expanded sponge comprising an electrolyte.

DETAILED DESCRIPTION

Figure 1:
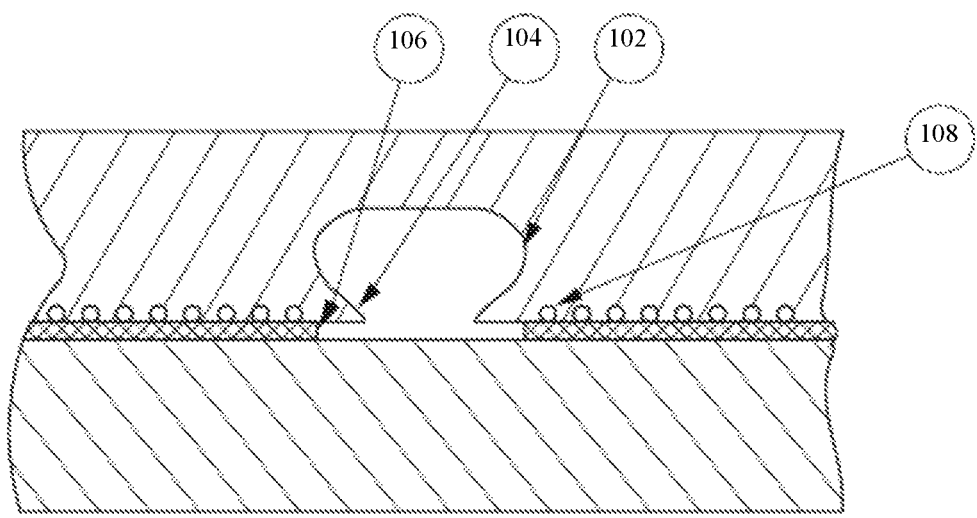
FIG. 1 shows a cross-section of an embodiment of a pressure-testing chamber having an "omega" shape.

As used herein, the terms "a" or "an" mean one or more unless these terms are otherwise limited by their use.

As used herein, the term "about" means±10% of a stated value.

The present disclosure provides pipe fittings with various features. The present disclosure provides a fitting that is tubular (straight or bent, such as straight sleeve or elbow joint) to join at least two pipes. The fitting comprises weldable plastic. In certain embodiments, the fitting comprises PE or PP. In some embodiments, the fitting comprises HDPE. The main tubular fitting part is referred to as a "sleeve." In some embodiments, at least one open end of the sleeve has two circular or circumferential sealing zones relative to the axial center of the sleeve—an inner sealing zone and an outer sealing zone. The sealing zones form a pair of circular or circumferential seals between an inserted pipe and the sleeve. The sealing zones are proximal to the end of the fitting and situated so that they can weld an inserted pipe. In some embodiments, each open end of the fitting comprises two circumferential sealing zones. In some embodiments, one or more open ends of the fitting comprises an inner sealing zone and an outer O-ring sealing zone, which is described in greater detail below.

The sleeve further comprises an annular space between the inner and outer sealing zones along the inner circumference of the sleeve. This space functions as a pressure-testing chamber for testing the inner seal formed between an inserted pipe and the fitting at the inner sealing zone and the outer seal formed between an inserted pipe and the fitting at the outer sealing zone. The inner sealing zone is the seal between the fluid contents of the piping system and the pressure chamber space. The outer sealing zone is the seal between the pressure-testing chamber and the ambient environment outside of the piping system.

Each pressure-testing chamber comprises an inlet, i.e. an opening from the pressure-testing chamber to the exterior of the fitting. In some embodiments, a valve is located at the end of the inlet on the outer surface of the sleeve. The pressure-testing chamber is created by the space between the inner and outer seals and between the inner surface of the sleeve and the outer surface of an inserted pipe. In some embodiments, the sleeve has a circumferential groove between the sealing zones. In an aspect of the present disclosure discussed below, the fitting comprises a valve, which is also the electrode for supplying electric current to one or more coils to enable electrofusion.

The pressure chamber can have the shape of a groove, carved out from the inner surface of the sleeve. The groove can have a variety of shapes. In some embodiments, the groove has a box-like shape. In other embodiments, the groove has a triangular shape. However, the shape should generally not have sharp corners because they create stress concentrations at the cornered portion of the cross-sections. Thus, a triangular groove looks more like a graphical representation of Gaussian distribution, i.e., with a rounded top of the triangle instead of a point. However, in such triangular shapes, a stress concentration would be focused on the edge of the fusion zone, thereby limiting the amount of pressure that can be applied and increasing the possibility of slow crack growth (SCG). In further embodiments, the groove has a round shape.

In some embodiments, the groove has a cross-section having one width near the inner surface of the fitting and a wider width further from the inner surface of the fitting. FIG. 1, which illustrates a pressure-testing chamber having an omega shape, exemplifies this. Groove 102 has a tapered surface on at least one side, forming edge 104 protruding between groove 102 and the inner surface of the fitting in proximity to adjacent sealing zone 106. By this design, when the pressure-testing chamber is pressurized, stress concentrations detrimental to the edge of the seals closest to the testing chamber are mitigated. Unlike a chamber whose cross-section is box-like or otherwise widest near the inner surface of the coupler, the stress generated from pressure testing is spread out over the first few coils of the windings 108. Conventionally, if the stress at the seal edge were to exceed allowable levels, micro cracks could form and foster slow crack growth (SCG)—a phenomenon known to be a common mode of failure in electrofusion joints. This channel design allows for pressure tests at higher pressure than other shapes. This results in a higher factor of safety associated with the fitting. Furthermore, the design also allows for a less bulky coupler. Other channel designs would require increased wall thickness to offset the stress created at the seal edge. In this respect, the design of this disclosure saves materials and costs.

In some embodiments, the pressure-testing chamber comprises a groove in the section of the pipe to be inserted in the fitting. In this embodiment, the groove on the pipe would align to an inlet on the fitting. When electrofused to the fitting, the pressure-testing chamber would be formed by the groove on the pipe, the inner surface of the fitting, and the inner and outer seals between the pipe and the fitting. An inlet through the fitting would allow for testing of the outer and inner seals via the pressure-testing chamber. In some embodiments, the pipe and fitting can both have grooves to form a pressure-testing chamber between the inner and outer sealing zones.

In some embodiments, the fitting also comprises one or more cold zones. A cold zone is a section of the fitting that does not melt. Typically, a cold zone is a section of the fitting that does not have a concentration of coil. In some embodiments, the fitting also comprises at least a first cold zone in between a first pair of sealing zones, at least a second cold zone in between a second pair of sealing zones, and at least one cold zone in between the first and second cold zones. The cold zone in between sealing zones helps to mitigate the effects of residual stress in pipe sections or misalignment resulting from poor insertion.

Each sealing zone comprises sealing means to form a seal with an inserted pipe. In some embodiments, at least one of the sealing zones comprises an electrofusion coil or an electrical heating coil. In some embodiments, the electrofusion coil section is arranged in or on the internal surface of the fitting encircling the sealing zone, and the fitting comprises contacts for supplying electric current to the first electrofusion coil. A seal is formed between the fitting and an inserted pipe by supplying electric current to the coil that produces heat in a sufficient and suitable amount to melt the plastic surface of the fitting in the sealing zone and the outside surface of the inserted pipe, thereby causing the melted plastic to weld and form a seal. As discussed further below, in some embodiments, the valve for the pressure-testing chamber is also the contact for supplying electric current to one or both electrofusion coil sections in each sealing zone.

In certain embodiments, a fitting comprises a sealing zone with different sealing means. In some embodiments, a sealing zone comprises an indent sized and shaped to hold an O-ring in the interior surface of the sleeve. In some embodiments, the fitting further comprises an O-ring. In some embodiments, the outer sealing zone is the O-ring sealing zone. When the O-ring sealing zone is the outer sealing zone and the inner sealing zone is an electrofusion sealing zone, then a person of ordinary skill in the art would understand that the joint is still an electrofusion joint because the inner seal, i.e., the seal proximal to the fluid contents of the piping system is an electrofusion seal. In some embodiments, the inner sealing zone is the O-ring sealing zone. In further embodiments, both sealing zones are O-ring sealing zones.

Figure 2:
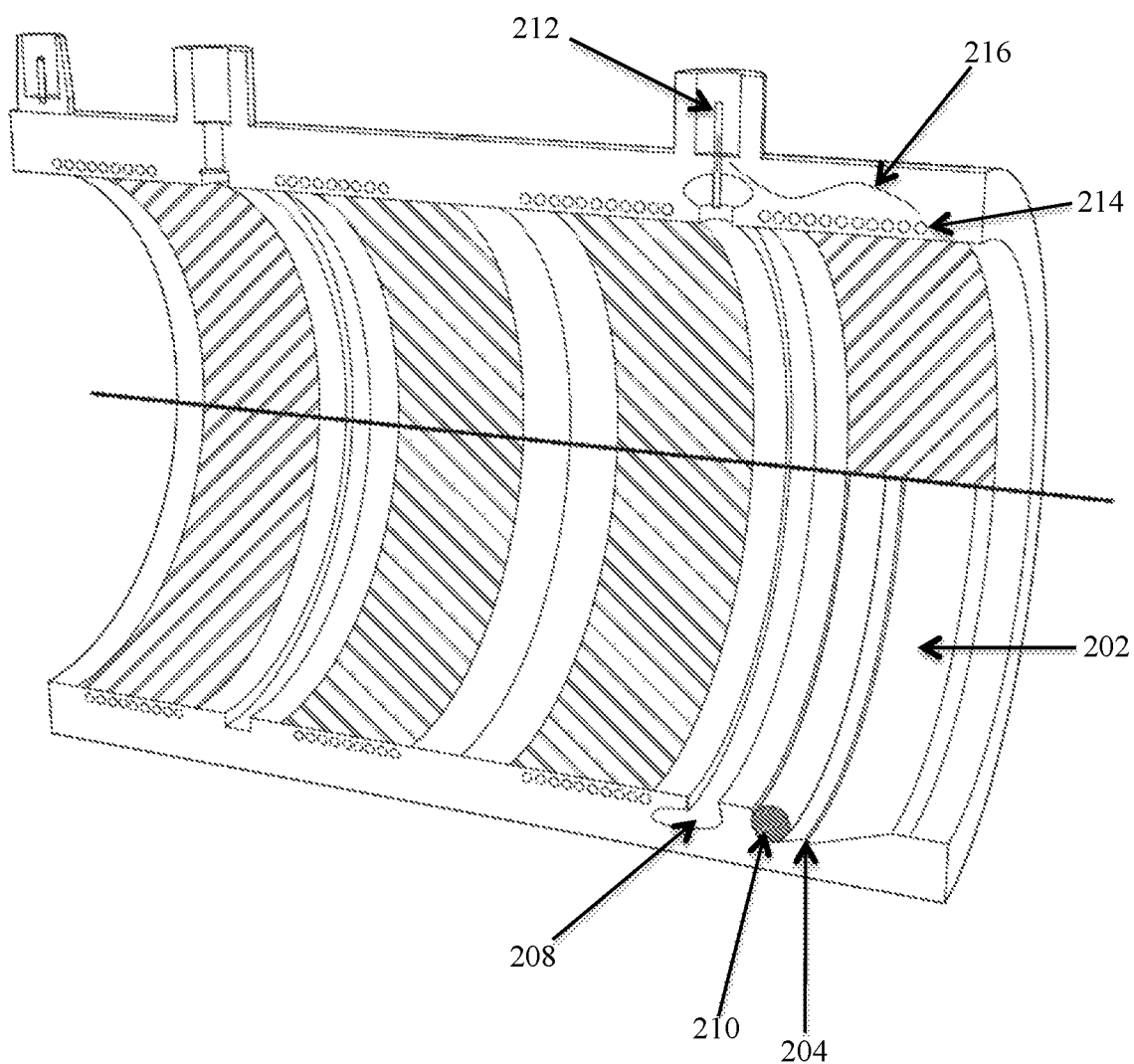
FIG. 2 is a cutaway of an illustrative mixture of multiple embodiments: the O-ring tapered indent with a ridge and a valve and current connector electronically connected to an electrofusion coil.

In another aspect, the present disclosure provides an improved design when at least one sealing zone comprises an O-ring sealing zone. Turning now to FIG. 2, in some embodiments, O-ring indent 202 is a groove with a tapered side distally from pressure-testing chamber 208 in between the sealing zones so that indent 202 gradually narrows in the direction away from pressure-testing chamber 208. In such an embodiment, when a pipe is inserted and the chamber is pressurized, O-ring 210 is pressed away from pressure-testing chamber 208 and moves along narrowing indent 202. This further tightens the seal between the fitting and the inserted pipe. In some embodiments, the O-ring indent further comprises ridge 204. When O-ring 210 moves along indent 202 and moves beyond ridge 204, ridge 204 locks O-ring 210 at that end of indent 202, thereby preventing O-ring 210 from moving back towards the pressure-testing chamber. As a result, the ridge further tightens the seal between the fitting and an inserted pipe. This locking feature can also be considered a form of secondary containment.

A further advantageous feature of the fittings of this disclosure is the non-destructive nature of the testing of the integrity of the seals, through the arrangement of the pressure-testing chambers of the fittings of the invention. The pressure-testing chambers have inlets that are on the outside of the fitting and need no drilling or guiding of probes through the pipes. In certain embodiments, the inlets are configured with valves, or valves can be part of external equipment used for pressure-testing. In some embodiments, the sleeve portion is dimensioned to allow for high pressure in the pressure chamber, thereby allowing for testing with desired pressure. The fittings of this disclosure can be used on all sizes of polyethylene pipe used in piping systems.

Pressure-Testing Valve and Current Connector

In another aspect, this disclosure provides a valve for pressure-testing pipe joints connected by the pipe fittings of this disclosure. In one aspect of the disclosure, the valve connected to the pressure chamber and the connector for supplying electric current to the coils for electrofusion are the same component. In some embodiments, an electrode sits at the end of the coil in the electrofusion fitting. In some embodiments, a counterpart to that electrode sits in a corresponding location at the opposite end of the coupler. In some embodiments, the coils are double wound so that both ends of the coil are situated at the same end allowing for the nodes to be side by side.

In one aspect of the present disclosure, the pressure-testing valve is situated on the pipe fitting so that it is (i) located directly over the testing chamber; and (ii) located outside of the integrity of the piping system specifically. When located directly over the pressure-testing chamber, the pathways pressurized during the test do not weaken or compromise the structural integrity of the fitting. As a result of these two features, the joint can be tested during its service time and can be classified as a Non Destructive Test (NDT).

The present disclosure provides the main structural welding zones which are necessary for complying with any current regulations such as EN1555. These zones are required to seal the pipe. The outer seals are considered test seals, back up seals, or secondary containment seals.

Another aspect of the present disclosure provides an arrangement of the valve such that the electrofusion coil can be double wound or otherwise connected back to the valve location allowing for the valve to also serve as an electrode. In some embodiments, the electrode has a plastic shell 1003 around it to ensure against any shock damaging the electrode. In certain embodiments, that shell can also be conductive to allow a current to be induced across the coil by using the shell 1003 as the electrode. This design allows for the following advantages over the prior art: a.) forward and backward compatibility of existing PE systems and the joints of this disclosure; b.) a viable mating site for a monitoring device for use in a smart joint or Smart Water Network; and c.) with the location outside of the main welding zone and the ability of the valve system to be rated to substantial pressures, the joint can provide secondary containment if the outer seal is sufficiently robust.

Returning to FIG. 2, in some embodiments, valve/electrode component 212 is connected to coil 214 via circuitry 216 for electrofusion at the outer sealing zone. For illustrative purposes only, FIG. 2 depicts the outer sealing zone as having both electrofusion coil 214 and O-ring sealing zone 202. This is for illustration purposes only. In practice, a sealing zone could not be both an electrofusion sealing zone and an O-ring sealing zone.

Monitoring Seal Integrity

Figure 3:
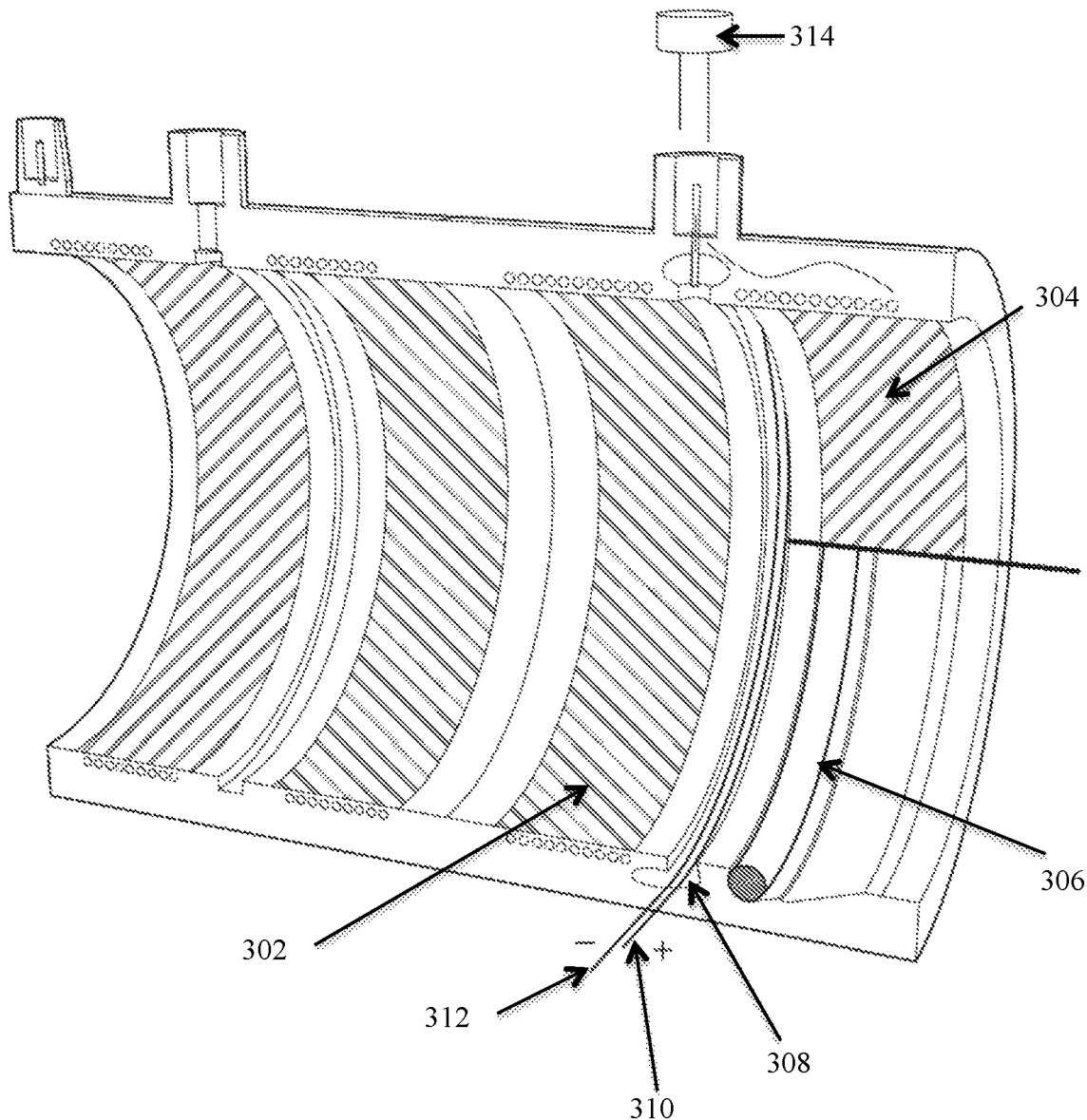
FIG. 3 is a cutaway of an illustrative mixture of multiple embodiments: an anode and cathode disposed within a pressure-testing chamber where the outer seal is either an O-ring seal or an electrofusion seal.

Yet another aspect of this disclosure provides fittings, systems, and methods for monitoring the integrity of joints, detecting a leak or breach in the integrity of a joint, and/or relaying information about a leak or breach in the integrity of a joint. As shown in FIG. 3, the pipe fittings of this disclosure have a seal on each side of pressure-testing chamber 308: inner seal 302 and outer seal 304/306 on either side. For illustrative purposes only, FIG. 3 depicts the outer sealing zone as being both electrofusion sealing zone 304 or O-ring sealing zone 306. This is for illustration purposes only. In practice, a sealing zone could not be both an electrofusion sealing zone and an O-ring sealing zone. If either inner seal 302 or outer seal 304/306 were to fail such that fluid flow in or out of the pressure-testing chamber is no longer prevented, one or more of the following conditions will occur:

1. In a piping system containing liquid where only the inner seal fails, the liquid would enter the chamber and the chamber pressure would equalize with the operating pressure of the piping system.
2. In a piping system containing a gaseous fluid where only the inner seal fails, the gaseous fluid would enter the pressure chamber and either remain separate from the ambient fluid of the chamber or mix with the ambient fluid of the chamber. The chamber pressure would equalize with the operating pressure of the piping system.
3. In a piping system containing liquid or gaseous fluid where only the outer seal fails, the chamber pressure would equalize with the ambient pressure outside of the piping system. If the pressure in the pressure chamber was lower than ambient pressure outside of the piping system, fluid would flow into the chamber. If the pressure in the pressure chamber was higher than ambient pressure outside of the piping system, fluid would flow out of the pressure chamber to outside of the piping system. In either case, the pressure chamber would be incapable of holding pressure from a test.
4. In a piping system containing liquid or gaseous fluid where both the inner seal and the outer seal fail, liquid would enter the chamber, fill the chamber completely or otherwise, and pass to the outside of the piping system. In this case, fluid losses are apparent and reminiscent of a leaky joint of standard design contributing to things such as NRW. However, this disclosure provides a chamber with a few states that can be sensed. For example, the following states can exist and be detected:
   a. The pressure in the chamber is now a function of the state of the entire piping system, so that the maximum pressure that the chamber could reach is the operating pressure of the piping system (dependently or mutually independently);
   b. The actual pressure in the chamber could be a measure of in scale of failure differential from inner seal to outer seal. For example, in the event that cracks in the seals are miniscule, the rate with which pressure is introduced for test purposes could allow for the determination of mass flow differential from inner vs. outer seal.
   c. The flow rate though the chambers could be a measure of scale of failure of both inner and outer seal, where the seal allowing for the least mass flow would be the governing factor for the flow rate.
   d. The temperature of the fluid is now relative to the ambient temperature of the external environment of the piping system and/or the operating fluid contained in the piping system.
5. Additionally, in a piping system containing a fluid where the inner seal and the outer seal fail, the state of the fluid in flow can be laminar or turbulent flow, and cavitation may occur.
6. Furthermore, in a piping system containing a gaseous fluid where the inner seal and the outer seal fail, the electrostatic break-down voltage difference between the ambient chamber fluid (gas state) and the leaking piped gaseous fluid can be detected.

One aspect of this disclosure is directed to fittings and methods for monitoring and detecting the above-described changes in states. The fittings described herein can further comprise a sensor fluidically connected to the inlet or pressure-testing chamber. In some embodiments, the sensor is selected or designed to monitor or detect one or more of the above-described states. In some embodiments, sensors can be designed and implemented to extract data for analysis and interpretation along the following exemplary organizational categories pertaining to seal failures: 1.) Cautionary, whereby the outer seal only has failed; 2.) Impending, whereby the inner seal only has failed; and 3.) Immediate, whereby both seals have failed.

In some embodiments, the sensor is in or proximal to the test site and the data gathered could be used to determine the state of the inner and outer seals. In some embodiments, the sensor is a temperature gauge. In some embodiments, the sensor is a thermocouple. For example, if a test chamber no longer holds pressure and a temperature sensor reads the test chamber as equal to the ambient environment temperature outside of the piping system rather than operating temperature of the fluid inside the pipe, this would indicate that the inner seal is intact and the outer seal is faulty.

There are many sensors that can be used in connection with the fittings of this disclosure. In some embodiments, the sensor is designed for passive water flow analysis. In certain embodiments, the sensor is an acoustic sensor or a vibration sensor. In other embodiments, the sensor is an air-gas ratio sensor, which can be used in gaseous pipelines. In some embodiments, the sensor is designed for volumetric airflow or fluid flow calculations. In certain embodiments, the sensor is a mass flow sensor.

In some embodiments, the sensor can be a specific gas sensor. For example, the specific gas sensor can be a sensor for $O_2$, $CO_2$, $H_2$, CO, etc.

In some embodiments, the sensor is designed to detect changes in pressure in the pressure-testing chamber. In certain embodiments, the sensor is a pressure sensor.

In some embodiments, the sensor is a water sensor.

In certain embodiments, the sensor is designed for circuit manipulation based on the state of the chamber. In some embodiments, the sensor is a chemical transistor or a chemical resistor.

In certain embodiments, the sensor is an ion sensor or a radiation sensor.

In other embodiments, the sensor is a galvanometer.

In some embodiments, the sensor is designed to determine pipe fluid flow or flow through pressure chamber. In certain embodiments, the sensor is a flow sensor or an mflow meter.

In some embodiments, the sensor is designed to determine damage caused by earthquake and other shock trauma leading to failure. In certain embodiments, the sensor is a strain gauge or piezoelectric sensor.

In some embodiments, the sensor is designed to determine temperature flow. In certain embodiments, the sensor is a heat flux sensor.

In some embodiments, the sensor is designed to gauge temperature using solid state methods. In certain embodiments, the sensor is a thermistor.

A further aspect of this disclosure is directed to fittings and methods for detecting a failure of a seal and collecting or storing data about the state of a seal. In some embodiments, the data is collected or stored on a device that can store data or transmit data over hard wired or wireless networks. In a piping system touted to last 100+ years, powering the sensing equipment is a challenge because the sheer volume of joints makes it impractical to use conventional methods. Furthermore, some smart water networks regulations require battery lifetimes of at least 15 years. This disclosure provides a solution that creates a power supply that can lie dormant and inactive until a failure presents itself, after which the power supply lasts a period of time dependent on design parameters. Furthermore, in circumstances where the power supply has expired, this disclosure also provides an embodiment where the data tracker component registers a state change noting the activation of the power unit and, with that activation, the leak associated with it. This change in state on the data can be permanent.

In one aspect, a fitting of this disclosure comprises a dormant battery and a data tracker. The dormant battery comprises a dry or a paste electrolyte disposed in a portion of the annular pressure-testing chamber, an anode, a cathode, and circuitry electronically connecting the anode, cathode, and the data tracker. Examples of electrolytes that can be used include soluble acids, soluble bases, or salts that dissociate in an aqueous solution. An electrolyte can be selected based on the contents of the piping system. Other considerations such as stability over time, availability, and cost are also considered when selecting an electrolyte. In some embodiments, the electrolyte is silver nitrate. In some embodiments, the electrolyte is a soluble acid. In some embodiments, the electrolyte is nitric acid. In some embodiments, the electrolyte is a salt. In some embodiments, the electrolyte is sodium chloride. In some embodiments, the electrolyte is an alkaline electrolyte. In certain embodiments, the electrolyte is selected from the group consisting of potassium hydroxide and sodium hydroxide. In some embodiments, the anode or cathode is copper. In some embodiments, the anode is zinc. In some embodiments, the anode is iron. In some embodiments, the cathode is manganese (IV) oxide. In some embodiments, the cathode is silver. In some embodiments, the cathode is nickel oxide. A person of ordinary skill in the art would understand that there are many combinations of anode, cathode, and electrolyte that could work in the described dormant batter.

In some embodiments, the dormant battery is a lithium-air battery without the aqueous solution.

In some embodiments, the dormant battery also comprises a stabilizer 1002 to ensure the effectiveness of the electrolyte over time. In some embodiments, the stabilizer is an antioxidant. An antioxidant can be selected to aid in the preservation of the dormant life of the battery. In some embodiments, the stabilizer is butylated hydroxytoluene (BHT). A person of ordinary skill in the art would understand that other stabilizers can also be used.

In some embodiments, the data tracker is an RFID chip. In some embodiments, the data tracker is a semiconductor. In some embodiments, the data tracker is a light-based memory chip. RFID chip and antenna assemblies relay data using near field communication. The distance over which data can be transmitted is dependent on whether it is a passive RFID (no power supplied) or an active RFID (power supplied). In some embodiments, an RFID affixed to every annular test ring is passive at time of install of the fitting. The RFID may contain and collect data including but not limited to temperature, date, time, name of installer, weld and cool time, geolocation, any data collected by a connected sensor, and other specs relative to the fitting's installation. In some embodiments, at least one other data point is included: a binary state of failure. In some embodiments, this data point is default set to indicate no leak has occurred. In some embodiments, the RFID chip and antenna assembly is connected to the anode and cathode, which can be differential metals. The anode and cathode enter a chamber containing the dry electrolyte and stabilizer mix. Referring back to FIG. 3, cathode 310 and anode 312 are disposed in pressure-testing chamber 308. This chamber may be the annular test ring or a chamber specifically purposed to house the dry electrolyte and stabilizer mix. Upon failure of the inner seal or outer seal or both, any fluid that can serve as the aqueous component (typically water) for the electrolyte (and stabilizer, if present) can activate the dormant battery when the liquid electrolyte/electrolytic fluid fills or partially fills the pressure test chamber. When the aqueous solution submerges, or sufficiently submerges, the anode and cathode, electron transfer occurs and a potential difference in volts is present at the anode and cathode, thereby powering the RFID, which can be contained in component 314. In some embodiments, upon reception of power the RFID records a state of failure on the chip permanently. With the remaining power, any sensors can record data to the RFID chip. In some embodiments, the RFID can enter an active state whereby its signal range is boosted significantly allowing the failure to be transmitted to a control station. If the power supplied to the RFID fades out and the control station is still unaware of the failure, the passive state of the RFID will permanently contain the failure and collected data such that any close up readings of the RFID would indicate the failure. These close up readings can be taken manually or by way of pipe robotics used in the pipe inspection industry. In some embodiments, the reading can be taken by a mobile device, such as a mobile phone or tablet. In such embodiments, the mobile phone or table can have software installed on it to enable the mobile device to read the RFID chip.

In the event of a failure that water enters into an electrolytic mix and effects a state change to the RFID, it can be assumed that the inner seal has failed. However, the outer seal may or may not be intact. In some embodiments, the sensor can relay the relevant seal data, based on the detection of the relevant change in state or states described above, to the data tracker which can then inform a control station or worker in the field reading the signal that there was an impending leak or an immediate leak. Depending on the piping system, one or more sensors can be designed or implemented to detect one or more of the states described herein.

Sensor data recorded to any chip or relayed to any monitoring station need not be dependent on failure to power it. In some embodiments, the data tracker can be externally powered. Key points in the system may receive static power to gather data for analytics to be performed in order to create a smart water network not dependent on failure. Static power can be provided based on conditions related to the piping system. In some embodiments, piping systems contained within a specific industrial area or station (e.g., a power plant, a manufacturing facility, a ship, an industrial building, etc.) could have all vital joints proximal to some power and monitoring connections. Embodiments with external static power are not limited to specific areas or station and can receive static power in metro areas where such supplying power is accessible and feasible.

This disclosure also provides a method for making the dormant power source. After the pressure test is conducted, and the integrity of the inner and outer seals confirmed, a vacuum can be imposed on the pressure-testing chamber, followed by the introduction of the electrolyte into the pressure-testing chamber after the vacuum is released. In some embodiments, a stabilizer is also introduced to the pressure-testing chamber with the electrolyte. The anode, cathode, and circuitry for connecting to a data tracker can be introduced to the fitting before or after the electrolyte is introduced into the pressure-testing chamber. At this stage, the integrity of the seals has been confirmed and a dormant battery has been created in the pressure-testing chamber.

In some embodiments, the dormant battery (comprising dry electrolyte, an anode, and a cathode) is a component separate from the fitting. In some embodiments, the inlet valve used for conducting a pressure test in the pressure-testing chamber can be removed from the fitting. In such embodiments, the inlet valve can be replaced with a dormant battery comprising a dry electrolyte, an anode, a cathode, and circuitry 1001 for connecting the anode, cathode, and data tracker(s). In such embodiments, the dormant battery 1004 need only be positioned so that an aqueous liquid that breaches an inner or outer seal can contact the electrolyte. In some embodiments, the dormant battery component further comprises a sensor. In some embodiments, the valve and dormant battery are the same component. In some embodiments, the dry electrolyte is contained in a portion of the annular testing chamber and the dormant battery component comprises an anode, a cathode, one or more data trackers, and circuitry necessary to connect the anode and cathode to the one or more data trackers. In some embodiments, the electrolyte is contained on a sponge or other absorbent material. FIG. 4A depicts sponge 402 comprising an electrolyte. FIG. 4B depicts expanded sponge 404 comprising an electrolyte after the sponge has come in contact with an aqueous liquid. A person of ordinary skill in the art would understand that the components—electrolyte, anode, cathode, circuitry, one or more data trackers, and one or more sensors—can be configured in numerous ways so that an aqueous solution entering the pressure-testing chamber would create a power source for the one or more connected data trackers and/or sensors. All of those configurations are intended to be encompassed by the scope of this disclosure.

Personal Flotation Devices

Another aspect of this disclosure is directed to personal flotation devices ("PFDs"). PFDs are frequently used in emergencies involving aircraft or watercraft. PFDs can be inflatable or comprise buoyant material or a combination of inflatable and buoyant material. Generally, PFDs contain a small battery and circuitry for powering a light or a beacon for signaling a person's location in the event of an emergency. Typically, the battery does not become fully connected to the circuit until it has become sufficiently wet or submerged in water. However, the battery loses its charge over time. As a result, PFDs comprising these batteries must be replaced periodically—even if the PFDs haven't been used—in order to make sure the light or beacon can be powered in the event of an emergency.

In one aspect, this disclosure is directed to a PFD comprising a dormant battery. In some embodiments, the dormant battery comprises a dry electrolyte, an anode, a cathode, and circuitry for connection to a device requiring power. In some embodiments, the dormant battery also comprises a stabilizer to maintain the electrolytes effectiveness. The dormant battery can be contained in a section of the PFD. In some embodiments, the section is a sealed pocket that can be permeated by water. In some embodiments, the dormant battery is a separate, self-contained component that can be attached to a PFD. In some embodiments, the electrolyte is silver nitrate. In some embodiments, the anode is zinc. In some embodiments, the cathode is copper. A person of ordinary skill in the art would understand that numerous combinations of electrolyte, cathode, and anode can be made. Such combinations are intended to be within the scope of this disclosure. Furthermore, the dry electrolytes, anodes, cathodes, and stabilizers described above for the dormant battery in the pipe fitting are also applicable to the PFD dormant battery.

When the PFD of this disclosure comes in contact with a sufficient amount of water, such that the dormant battery is submerged or sufficient water enters the dormant battery, the water creates an electrolytic solution and the battery becomes active. Current is allowed to flow and power a device. In some embodiments, the device is a light. In some embodiments, the device is a beacon transmitting information, e.g., an SOS message or location information.

A major advantage that the PFD comprising a dormant battery over the prior art is increased shelf life. Batteries in prior art PFDs lose their charge over time. The dormant batteries of this disclosure maintain the ability to be activated for a longer time. The increased shelf life of the PFDs of this disclosure cuts down on the replacement costs.

The invention claimed is:

1. A pipe fitting comprising
a hollow tubular sleeve comprising a first open end and a second open end, wherein the first open end is configured to receive a first pipe and the second open end is configured to receive a second pipe;
a first pair of circumferential sealing zones proximal to the first open end of the sleeve comprising a first inner circumferential sealing zone and a first outer circumferential sealing zone, wherein the first inner circumferential sealing zone comprises a first inner coil to form a seal with an inserted pipe;
a first circumferential pressure chamber arranged between the first inner circumferential sealing zone and the first outer circumferential sealing zone, wherein the first circumferential pressure chamber comprises a first inlet; and
a first valve and current connector fluidically coupled to the first inlet and electronically connected to the first inner coil, wherein the first outer circumferential sealing zone comprises an indent sized and shaped to hold an O-ring and having a depth sufficient to enable the O-ring to make a seal with an inserted pipe and wherein the depth of the indent narrows longitudinally away from the first circumferential pressure-testing chamber along the inner surface of the fitting.

2. The pipe fitting of claim 1, further comprising
a second pair of circumferential sealing zones proximal to the second open end of the sleeve comprising a second inner circumferential sealing zone and a second outer circumferential sealing zone, wherein the second inner circumferential sealing zone comprises a second inner coil to form a seal with an inserted pipe;
a second circumferential pressure chamber arranged between the second inner circumferential sealing zone and the second outer circumferential sealing zone, wherein the second circumferential pressure chamber comprises a second inlet; and
a second valve and current connector fluidically coupled to the second inlet and electronically connected to the second inner coil.

3. The pipe fitting of claim 1, wherein the indent further comprises a ridge.

4. The pipe fitting of claim 3, further comprising an O-ring disposed in the indent.

5. The pipe fitting of claim 1, wherein the first valve and current connector further comprises a shell.

6. The pipe fitting of claim 1, wherein the first outer circumferential sealing zone comprises a first outer coil to form a seal with an inserted pipe.

7. The pipe fitting of claim 6, wherein the first valve and current connector is further electronically connected to the first outer coil.

8. A pipe fitting comprising
a hollow tubular sleeve comprising a first open end and a second open end, wherein the first open end is configured to receive a first pipe and the second open end is configured to receive a second pipe;
a first pair of circumferential sealing zones proximal to the first open end of the sleeve comprising a first inner circumferential sealing zone and a first outer circumferential sealing zone, wherein the first inner circumferential sealing zone comprises a first inner coil to form a seal with an inserted pipe;
a first circumferential pressure chamber arranged between the first inner circumferential sealing zone and the first outer circumferential sealing zone, wherein the first circumferential pressure chamber comprises a first inlet;
a sensor fluidically coupled to the first circumferential pressure-testing chamber; and
a data tracker coupled to the sensor.

9. The pipe fitting of 10, wherein the first outer circumferential sealing zone comprises a first outer coil to form a seal with an inserted pipe.

10. The pipe fitting of claim 8, wherein the sensor is configured to detect a breach of the first inner circumferential sealing zone or the first outer circumferential sealing zone.

11. The pipe fitting of claim 8, wherein the sensor is selected from the group consisting of an acoustic sensor, a vibration sensor, an air-gas ratio sensor, a mass flow sensor, an O2 sensor, a CO2 sensor, a CO sensor, an H2 sensor, a chemical transistor, a chemical resistor, an ion sensor, a galvanometer, a flow sensor, a mass flow rate sensor, a strain gauge, a piezoelectric sensor, a heat flux sensor, a thermistor, and a thermocouple.

12. The pipe fitting of claim 11, wherein the sensor is a thermocouple.

13. The pipe fitting of claim 8, wherein the data tracker is an RFID chip.

14. The pipe fitting of claim 8, further comprising a power source electronically coupled to the sensor.

15. The pipe fitting of claim 8, wherein the power source is a battery.

16. The pipe fitting of claim 15, wherein the battery is a dormant battery disposed in at least a portion of the first circumferential pressure-testing chamber, the dormant battery comprising a dry electrolyte; an anode; a cathode; and circuitry electronically coupling the anode, the cathode, and the sensor.

17. A pipe fitting comprising
a hollow tubular sleeve comprising a first open end and a second open end, wherein the first open end is configured to receive a first pipe and the second open end is configured to receive a second pipe;
a first pair of circumferential sealing zones proximal to the first open end of the sleeve comprising a first inner circumferential sealing zone and a first outer circumferential sealing zone, wherein the first inner circumferential sealing zone comprises a first inner coil to form a seal with an inserted pipe;
a first circumferential pressure chamber arranged between the first inner circumferential sealing zone and the first outer circumferential sealing zone, wherein the first circumferential pressure chamber comprises a first inlet;
a data tracker disposed at or proximal to the exterior of the sleeve; and
a dormant battery disposed in at least a portion of the first circumferential pressure chamber, the dormant battery comprising
a dry electrolyte;
an anode;
a cathode; and
circuitry electronically coupling the anode, the cathode, and the data tracker.

18. The pipe fitting of claim 17, wherein the first outer circumferential sealing zone comprises a first outer coil to form a seal with an inserted pipe.

19. The pipe fitting of claim 18, wherein the dormant battery further comprises a stabilizer.

20. The pipe fitting of claim 19, wherein the stabilizer is butylated hydroxytoluene.

21. The pipe fitting of claim 20, wherein the data tracker is an RFID chip.

22. The pipe fitting of claim 21, wherein the dry electrolyte is selected from the group consisting of silver nitrate, nitric acid, sodium chloride, potassium hydroxide, and sodium hydroxide.

23. The pipe fitting of claim 22, further comprising a sensor electronically coupled to the data tracker.

24. The pipe fitting of claim 23, wherein the sensor is a thermocouple.

25. The pipe fitting of claim 24, wherein the fitting comprises polyethylene.

26. The pipe fitting of claim 25, wherein the polyethylene is HDPE.

* * * * *